Dec. 18, 1934. E. I. SPONABLE 1,984,438
SOUND CAMERA
Filed March 29, 1927 2 Sheets-Sheet 1
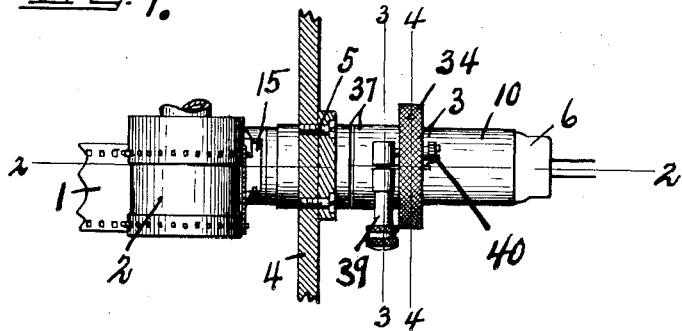
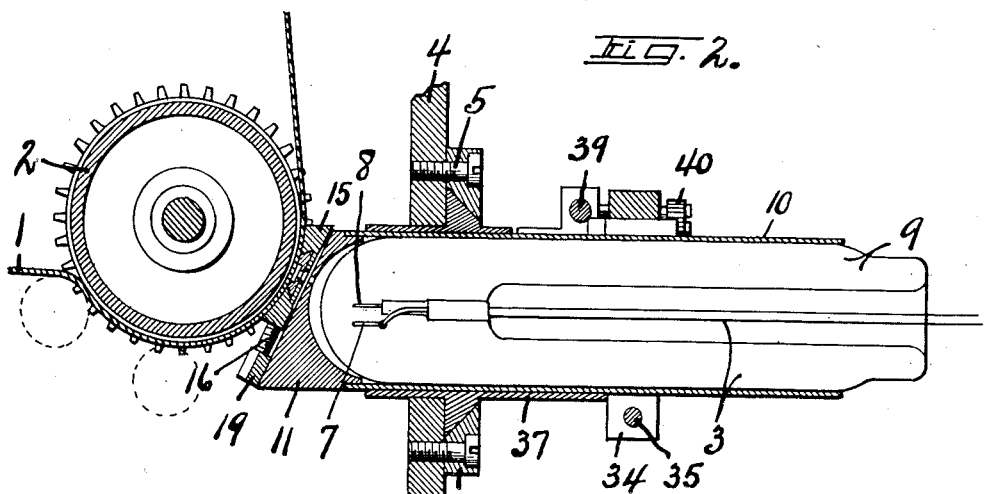
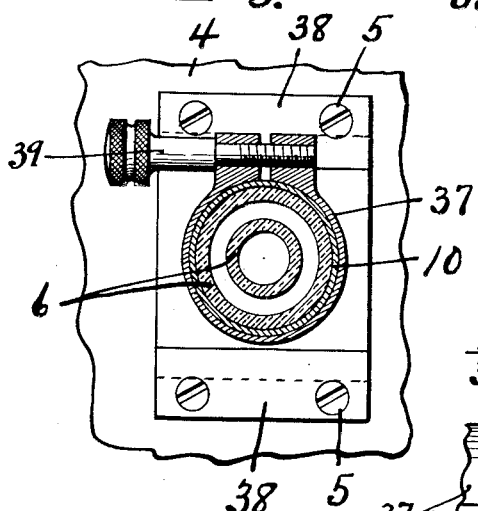
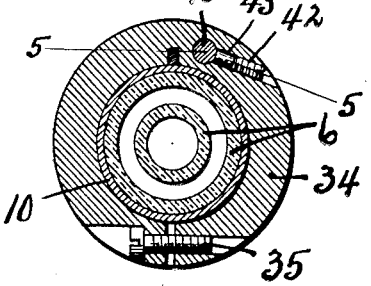

Dec. 18, 1934.  E. I. SPONABLE  1,984,438
SOUND CAMERA
Filed March 29, 1927   2 Sheets-Sheet 2
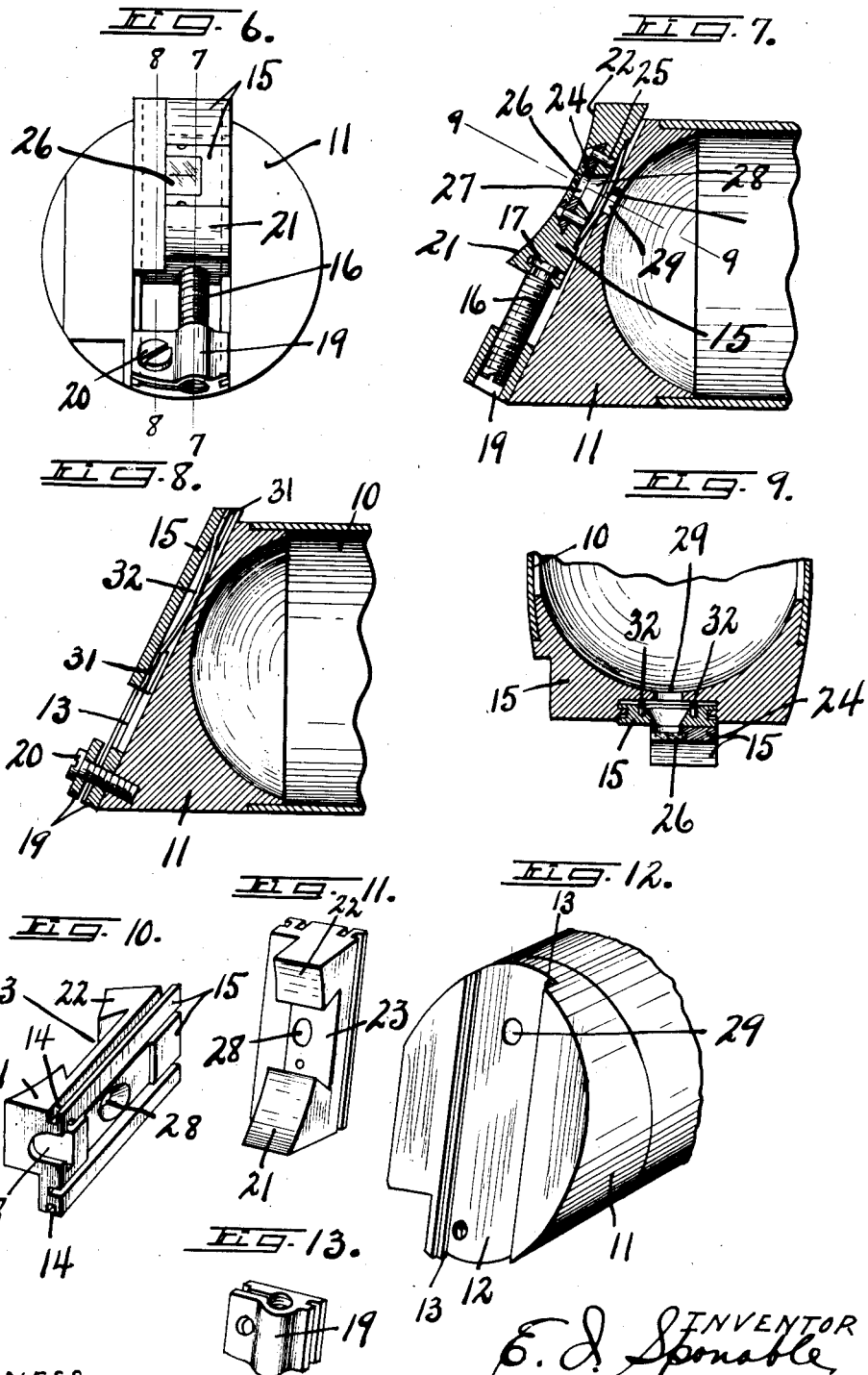

Patented Dec. 18, 1934

1,984,438

UNITED STATES PATENT OFFICE 1,984,438

SOUND CAMERA

Earl I. Sponable, New York, N. Y., assignor, by mesne assignments, to Movietonews, Inc., New York, N. Y., a corporation of New York Application March 29, 1927, Serial No. 179,213

19 Claims. (Cl. 179—100.3)

This invention relates to certain new and useful improvements in sound cameras designed particularly for producing a photographic record of light variations corresponding to electrical variations such as may be produced by sound wave variations.

It is found that in order to obtain an accurate photographic record of light variations, it is quite essential that the film should move in contact with the unit which contains the slot through which the light waves pass to the film.

It is further found that when the film moves in contact with a slot unit rigidly mounted, that due to variations in the thickness of the film the slot unit will soon become scratched or broken, and perhaps the film injured. As a result of this fact, it has been common practice to run the film at a slight distance away from the slot unit, and as a result the best possible photographic record was not obtained.

The object of this invention is the production of a structure in which the film may be run in actual contact with the slot unit due to the fact that provision is made for permitting slight movement of the slot unit in the direction of the radius of the circle in which the film is moving during taking of the photograph.

Other objects and advantages relate to the details of the structure and the particular features of speed and adjustment of the elements thereof, all as will more fully appear from the following description taken in connection with the accompanying drawings, in which:—

Figure 1 is a top elevation of a structure of this invention.

Figure 2 is a section on line 2—2, Figure 1.
Figure 3 is a section on line 3—3, Figure 1.
Figure 4 is a section on line 4—4, Figure 1.
Figure 5 is a section on line 5—5, Figure 4.
Figure 6 is a front elevation of the lamp-supporting tube with its adjustable holder for the slot unit.
Figure 7 is a section on line 7—7, Figure 6.
Figure 8 is a section on line 8—8, Figure 6.
Figure 9 is a section on line 9—9, Figure 7.
Figures 10 and 11 are perspective views of the holder for the slot unit.
Figure 12 is a perspective view of the front end of the lamp-supporting tube with the slot unit holder removed.
Figure 13 is a perspective view of the lamp which carries the adjusting screw for the slot unit holder.

The particular apparatus here disclosed is designed for the taking of the photographic record, while the film 1 is moving around the ordinary feed and take-up sprocket 2 of a moving picture machine, in other words, while the film is moving in the arc of a circle around the feed and take-up sprocket, and for this reason the tubular holder for the lamp generally indicated at 3 is projected through and secured to the wall 4 of a moving picture camera as by screws 5. The lamp 6 need not herein be described in detail, as these details do not constitute a claimed portion of the invention. In general, however, this lamp comprises two spaced electrodes 7 and 8 enclosed in a bulb 9 of glass, quartz, or other suitable material, the electrodes being connected in circuit with suitable means for varying the glow about the cathode in accordance with electrical variations, as for instance produced in accordance with sound wave variations.

The lamp 6 is tightly fitted in a metallic tube 10 provided with a front head 11 secured to the tube in any suitable manner and having a forwardly and downwardly inclined front face, as perhaps best shown in Figure 12, said front face being formed with a channel 12 extending vertically of the tube 10 and from the upper to the lower edge of the front head.

The side walls bordering the channel 12 are formed with inwardly projecting tongues 13 adapted to fit in the lateral grooves 14 in the opposite sides of the slot unit holder 15 and the tongues are of less thickness than the height of the channels 14 so as to permit slight relative movement of the slot unit holder toward and from the front head 11.

The slot unit holder 15 is maintained in proper vertical position on the front head 11 and is adjusted along the front head in the channel 12 by means of a screw 16 formed with a head 17 fitted into an under-cut socket 18 formed in one end of the holder, the edges bordering the socket 17 fitting into a circular groove in the screw. The other end of the screw has a threaded relation with a clamp 19 secured to the front head 11 by screw 20, and as this clamp is split at one side by adjustment of the screw 20 the tension upon screw 16 may be adjusted.

By threading screw 16 back and forth in the socket 19 the slit unit holder can be properly positioned with respect to the sprocket 2. Further, this holder is formed with two shoes 21 and 22 having their front faces accurately machined or shaped upon a radius exactly the same as the radius of the film sprocket 2. Between the two shoes 21 and 22 there is an undercut or keystone shaped recess 23 in which a metallic plate 24 of a form similar in shape to the recess and capable of being slid laterally therein is secured by means of pins 25. This plate carries the slit unit 26 which may be secured to the plate in any suitable manner, and the plate is formed with an opening 27 registering with the opening 28 in the holder 15 and with an opening 29 in the front head 11 to permit the passage of light from the lamp 6 to the slit unit, and through the narrow elongated slit provided therein.

This slit unit may be of any desired construction so long at it permits the passage of a line of light of desired form and shape to the film 1 as it moves past.

In order to support the slit unit holder 15 in a manner to permit slight movement radially of the sprocket 2, the holder is formed in its rear side with a pair of spaced longitudinal grooves 30 upon opposite sides of the opening 28 and adapted to receive the straight ends 31 of springs 32 having their central portions bowed rearwardly toward the front face 11 when the holder is in position in the channel 12. These springs are of proper size and tension to support the holder 15 and to permit it to automatically adjust itself through a limited movement toward and from the sprocket 2 when the apparatus is assembled in operative condition.

As illustrated here, the tube 10 is tightly confined around the lamp 6 by a split clamp 34, the split edges of which are adapted to be drawn toward each other by screw 35. Further, the tube 10 is slidably supported in a second tube 37 which tube is rigidly secured to the wall 4 by the taper strips 38 and the rear portion of the tube 3 is split and its split edges are provided with journals for the reception of a screw 39 for drawing the edges of the rear portion of the tube 3 tightly about the tube 10 to provide a rigid structure.

In order to adjust the tube 10 forwardly or rearwardly in the tube 37, the clamp 34 is provided with a threaded opening for the reception of a screw 40 adapted to bear against the rear side of one of the journals 31 which receive the screw 39. The screw 39 may be loosened and the desired adjustment effected by screw 40, whereupon the screw 39 may again be tightened. Additional means is provided in the form of a set screw 42 extending through a threaded opening in the clamp 34 and adapted to press a plug 43 of cat-gut or similar material against the screw 40 to prevent rotation.

It will be apparent from the above that the arcuate shoes 21 and 22 upon opposite sides of the slot unit 27 constitute a curved support for the film on a radius substantially the same as the radius of the sprocket 2 about which the film is moving, and that the springs 32 constituting flexible and automatic variable support for the holder and the slit unit permitting the slit unit to automatically conform to any inequalities in the film, while at all times maintaining the slit closely against the film, whereby an improved sound record can be produced, and altho I have shown and described a specific structure as constituting a preferred embodiment of the invention I do not desire to restrict myself to the details of the same or to the particular form and relation of the parts thereof, nor do I desire to limit the invention specifically to the producing of a photographic record as it is also efficiently usable in the reproduction of such a record in which it is essential that the film should move past a slot of the same form and shape as the one through which the picture was taken and in similar cross relation if accurate reproduction is effected.

For that reason I desire to claim the structure altho primarily usable as a producing apparatus; also as a reproducing apparatus.

I claim:

1. In an apparatus of the class described, a rotary sprocket about which a film is adapted to move, a slit unit and a resilient support for the slit unit adapted to maintain the same in contact with the film moving around the sprocket, and means for adjusting the holder tangentially of the sprocket.

2. In an apparatus of the class described, a rotary sprocket about which a film is adapted to move, a holder for the slit unit, a flexible support for the holder, and means for adjusting the holder tangentially of the sprocket.

3. In an apparatus of the class described, a rotary sprocket about which a film is adapted to move, a holder for the slit unit, spring means urging the holder toward the sprocket, and means for adjusting the holder tangentially of the sprocket.

4. In an apparatus of the class described, a tube for supporting a lamp, a front head for the tube, said head having a forwardly and downwardly inclined front face provided with a channel, a slit unit holder mounted in the channel, and a slit unit carried by the holder.

5. In an apparatus of the class described, a tube for supporting a lamp, a front head for the tube, said head having a forwardly and downwardly inclined front face provided with a channel, a slit unit holder mounted in the channel, a slit unit carried by the holder, and resilient means tending to press the holder away from the front head.

6. In an apparatus of the class described, a tube for supporting a lamp, a front head for the tube, said head having a forwardly and downwardly inclined front face provided with a channel, a slit unit holder mounted in the channel, a slit unit carried by the holder, and means for adjusting the holder along the channel in the head.

7. In an apparatus of the class described, a tube for supporting a lamp, a front head for the tube, said head having a forwardly and downwardly inclined front face provided with a channel, a slit unit holder mounted in the channel, a slit unit carried by the holder, resilient means tending to press the holder away from the front head, and means for adjusting the holder along the channel in the head.

8. In an apparatus of the class described, a tube for supporting a lamp, a front head for the tube, said front head having a channel, a slit unit holder mounted in the channel, springs having their opposite ends engaged with the holder and their central portions bowed away from the holder and in contact with the front head, and a slit unit carried by said holder.

9. In an apparatus of the class described, a tube for supporting a lamp, a front head for the tube, said front head having a channel, a slit unit holder mounted in the channel, springs having their opposite ends engaged with the holder and their central portions bowed away from the holder and in contact with the front head, a slit unit carried by said holder, and means for adjusting said holder along said channel.

10. The combination with a rotary member around which a film is adapted to move, of a slit unit and a spring support for said unit, and a holder supporting the slit unit, and a spring support for said holder.

11. In an apparatus for producing a photographic record of light variations corresponding to sound wave variations, a rotary sprocket about which a film is adapted to move, a lamp casing, a member having an opening therethrough secured to the forward end of the lamp casing and having a concave surface of substantial length formed on a radius substantially the same as the radius of the sprocket, said member being movable toward and from the sprocket so as to be capable of tightly pressing a film against the contour of the sprocket, and a source of light within said lamp casing.

12. In an apparatus for producing a photographic record of light variations corresponding to sound wave variations, a rotary sprocket about which a film is adapted to move, a lamp casing, a member having an opening therethrough secured to the forward end of the lamp casing and having a concave surface of substantial length formed on a radius substantially the same as the radius of the sprocket, said member being movable toward and from the sprocket so as to be capable of tightly pressing a film against the contour of the sprocket, a source of light within said lamp casing, and a spring interposed between the lamp casing and said member.

13. In an apparatus for producing a photographic record of light variations corresponding to sound wave variations, a rotary sprocket about which a film is adapted to move, a lamp casing, a member having an opening therethrough secured to the forward end of the lamp casing and having a concave surface of substantial length formed on a radius substantially the same as the radius of the sprocket, said member being movable toward and from the sprocket so as to be capable of tightly pressing a film against the contour of the sprocket, a source of light within said lamp casing, a spring interposed between the lamp casing and said member, and means for adjusting said member on said lamp casing in a direction tangential to the sprocket.

14. In combination with a sprocket and a photographic film thereon and conforming to the curve thereof, a slit holder provided with a pad having the same curvature of said film, means for resiliently holding said pad in engagement with said film, and a slit member in said pad engaging said film at a point tangential thereto.

15. In combination with a sprocket and a photographic film thereon and conforming to the curve thereof, a slit holder having a pad with the same curvature of said film, means resiliently holding said pad in engagement with said film, a slit member in said pad, and means for adjusting said pad to bring said slit member into engagement with said film at a point tangential thereto.

16. In combination with a curved film surface, a floating slit member having resilient engagement with said film surface at a point tangential thereto, means for holding said slit member, and means for adjusting said slit member with respect to said film, said second mentioned means comprising a screw engaging said slit member and said first mentioned means.

17. A slit holder for photographically recording sound on film comprising a tube provided with a slit member at one end, said tube being adapted to receive a light source, means for communicating light from said source through a floating slit member in engagement with a continuous film moving over a curved surface, and screw means for adjusting said floating slit member tangentially with respect to said curved surface.

18. In combination with a curved film surface, a slit holder adjacent thereto, a slit member in said holder engaging said film at a point tangential thereto, and means within said slit holder for automatically compensating for varying thickness in the film whereby said slit member is always maintained in engagement with said film.

19. In combination with a moving curved film surface, a slit holder having a part conforming to the curvature thereof, a slit member in said part, and spring means mounted within said holder for resiliently holding said slit member in contact with said film at a point tangential to the curvature thereof.

EARL I. SPONABLE.